(12) United States Patent
Andersen

(10) Patent No.: US 8,177,609 B2
(45) Date of Patent: May 15, 2012

(54) APPARATUS FOR PROCESSING CRUSTACEANS

(75) Inventor: Erik Andersen, Rungsted Kyst (DK)

(73) Assignee: Albus Solutions Limited, Londonderry (GB)

( * ) Notice: Subject to any disclaimer, the term of this patent is extended or adjusted under 35 U.S.C. 154(b) by 0 days.

(21) Appl. No.: 13/128,574

(22) PCT Filed: Nov. 10, 2009

(86) PCT No.: PCT/EP2009/008012
§ 371 (c)(1),
(2), (4) Date: Jun. 28, 2011

(87) PCT Pub. No.: WO2010/054793
PCT Pub. Date: May 20, 2010

(65) Prior Publication Data
US 2011/0269384 A1 Nov. 3, 2011

(30) Foreign Application Priority Data
Nov. 11, 2008 (GB) .................................. 0820599.9

(51) Int. Cl.
*A22C 29/02* (2006.01)
(52) U.S. Cl. .......................................................... 452/1
(58) Field of Classification Search ............. 452/1–6, 452/8–10
See application file for complete search history.

(56) References Cited

U.S. PATENT DOCUMENTS

| | | | |
|---|---|---|---|
| 1,367,546 A | | 2/1921 | Hirth et al. |
| 3,277,517 A | * | 10/1966 | Jonsson ............................ 452/5 |
| 3,451,100 A | | 6/1969 | Lee |
| 4,016,625 A | * | 4/1977 | Mitchell ........................... 452/4 |
| 4,019,224 A | * | 4/1977 | Amaria et al. .................... 452/1 |
| 4,121,322 A | * | 10/1978 | Rutledge ........................... 452/9 |
| 4,222,153 A | * | 9/1980 | Schmidt ............................ 452/5 |
| 4,439,893 A | * | 4/1984 | Betts ................................. 452/3 |
| 4,531,261 A | | 7/1985 | Sanaka |
| 4,785,502 A | * | 11/1988 | Howard ............................ 452/8 |
| 5,435,775 A | * | 7/1995 | Jonas ................................ 452/2 |
| 5,839,952 A | * | 11/1998 | Pollingue ......................... 452/8 |
| 6,042,465 A | * | 3/2000 | Larson et al. ..................... 452/9 |
| 6,102,790 A | | 8/2000 | Cowsar et al. |
| 6,168,512 B1 | * | 1/2001 | Allain ........................... 452/179 |
| 6,248,010 B1 | * | 6/2001 | Sirgo et al. ....................... 452/5 |
| 6,488,576 B1 | * | 12/2002 | Shelton ............................. 452/3 |
| 7,357,706 B2 | * | 4/2008 | Hansen ............................. 452/2 |
| 7,867,067 B2 | * | 1/2011 | Dancy et al. ..................... 452/5 |

OTHER PUBLICATIONS

European Patent Office (International Search Authority), International Search Report and International Preliminary Report on Patentability, PCT/EP2009/008012, Jun. 29, 2010 and May 17, 2011.

* cited by examiner

*Primary Examiner* — Richard Price, Jr.
(74) *Attorney, Agent, or Firm* — IpHorgan Ltd.

(57) ABSTRACT

An apparatus for processing crustaceans comprising a feeder for feeding crustaceans to a singulating and conveying device, said singulating and conveying device delivering the crustaceans individually to at least one separating device, said at least one separating device separating the tail section of each crustacean from the head section thereof.

19 Claims, 4 Drawing Sheets

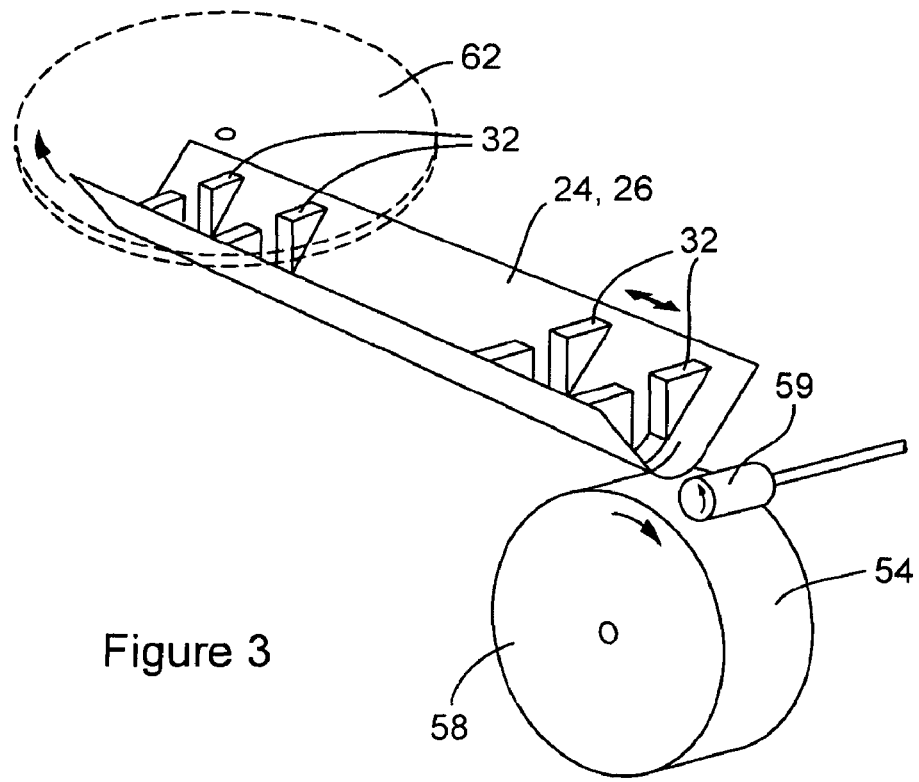
Figure 3
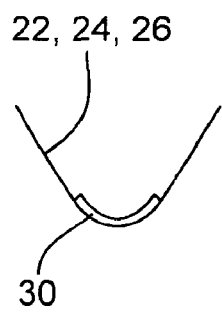 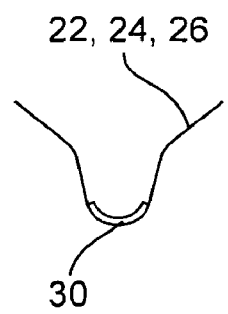 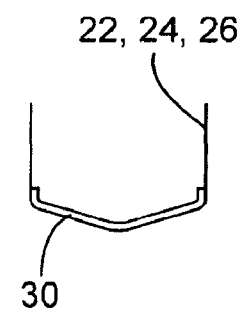
Figure 4a   Figure 4b   Figure 4c
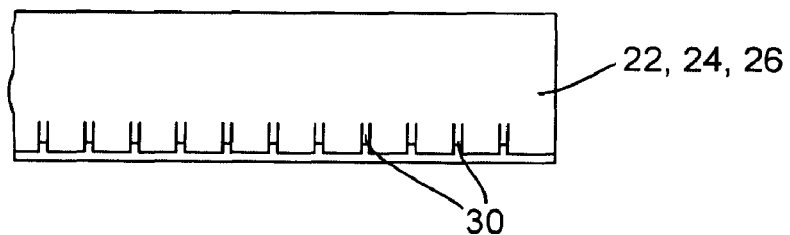
Figure 5

APPARATUS FOR PROCESSING CRUSTACEANS

This invention relates to an apparatus for processing crustaceans, and in particular to an apparatus for orienting, singulating and de-heading crustaceans, in particular nephrops norvegicus, and also shrimp, lobsters or crawfish (*Homarus, palaemon, pandalus, penaeus, crangon* or related geni).

*Nephrops norvegicus*, also known as Dublin bay prawn, Norway lobster or Langoustine, is widely distributed within the Eastern Atlantic region as far north as Iceland, the Faeroes and northwestern Norway, and as far south as the Atlantic coast of Morocco, however is most abundant in waters around the northern British Isles. The species forms one of the most important fisheries in the northeast Atlantic, particularly for a number of countries within the EU, with average annual landings of 60,000 t reported in FAO statistics. In British waters, the *Nephrops* fishery has grown rapidly since it began in the 1950s and is the third most valuable fishery in the North Sea with landings in 2000 of 9,837 tonnes worth £22.3 m GBP. In Scotland landings in 2000 of 10,733 tonnes of *Nephrops norvegicus* were valued at £25.7 mGBP. The *Nephrops* fishery is Ireland's most valuable demersal fishery with annual landings worth over €15 m in 2006.

These crustaceans typically grow to a maximum length of 24 cm and are caught in a range of habitats, from shallow coastal waters to around 800 meters in offshore waters, mainly using otter board single and twin rig trawls. The labour requirements for such vessels are significant, requiring up to 8 crew for hand de-heading of smaller sized prawns, whereby the meat containing tail must be removed by hand from the head portion of each prawn for the scampi market. This work is very time consuming, tedious and costly and the industry continually faces major challenges retaining sufficiently skilled crew due to the particularly difficult working conditions. The burden of labour costs along with increasing operational costs, driven by the increasing price of fuel, is placing a major financial strain on vessel owners. In addition, due to significant time inefficiencies onboard the vessel, product quality is adversely affected because the prawns that await de-heading may be left in ambient temperatures for over 18 hours.

Another commercially significant catch in more Northern waters is deep water prawn *Pandalus borealis*, sometimes referred to as "Northern Shrimp". Annual global catches for this species are almost 400,000 tons, which represents 70% of cold water fished shrimp. Canada, Greenland, Norway and Iceland are the principle fishing nations prosecuting this species on both the North East and North West Atlantic waters.

While attempts have been made to automate the de-heading operation, to date, none have been able to successfully, dependably and reliably feed, separate and correctly orient the prawns and subsequently dissect the head from the tail section without damaging the product and thus prior mechanised solutions have not been able to replace hand de-heading or at least hand feeding of prawns and shrimp to a de-heading mechanism.

According to a first aspect of the present invention there is provided a separating device for separating a head region from a tail region of a crustacean, said separating device comprises a reciprocating member moveable against a conveying surface to pinch, squeeze and/or cut a crustacean between the reciprocating member and the conveying surface at a predetermined location between the head region and the tail region of the crustacean to separate the head region from the tail region thereof.

Preferably said conveying surface comprises a conveying roller. Said conveying roller may be driven by means of a drive motor, preferably via suitable gearing. Alternatively the conveying surface may comprise a conveyor belt.

In one embodiment a pinch roller is mounted parallel to said conveying surface to act against said conveying surface for flattening and guiding crustaceans against said conveying surface. Preferably said pinch roller is arranged to control the speed of movement of the crustaceans along the conveying surface.

In one embodiment a pinch roller may be mounted on said reciprocating member to define a pinch between said reciprocating roller and said conveying roller for separating the head region from the tail region of a crustacean. Said pinch roller may be rotatably driven. Where said conveying surface defines a conveying roller said pinch roller may be driven to rotate in an opposite direction to said conveying roller to draw a crustacean through said pinch defined between said pinch roller and said conveying roller as said pinch roller is moved towards the conveying roller to separate the head portion from the tail portion of said crustacean.

Activation of the separating device may be controlled by a control means including means for determining when a crustacean is at the correct position for the reciprocating member to strike the crustacean at said predetermined location. In one embodiment, said determining means comprises a light emitter mounted on one side of conveying surface and at least one light receiver mounted on an opposite side of the conveying surface for detecting the presence of a crustacean therebetween. Said determining means may detect the correct position of a crustacean for triggering the separating means by detecting a difference in translucency between the head and tail sections of the crustacean.

A reciprocating pusher may be provided adjacent and downstream of said reciprocating member, moveable perpendicular to the reciprocating member and substantially transverse to the normal direction of movement of the crustaceans to assist separation of the tail section from the head section and urging one or both of the separated section towards a respective collection region. The pusher may be mounted on the reciprocating member. Alternatively, or additionally, one or more air jets may be provided for urging one or both of the separated sections to a respective collection region. One or more air jet may be provided to urging the detached head portions towards a head portion collection zone to ensure separate collection of the head and tail portions of the crustaceans.

According to a further aspect of the present invention there is provided an apparatus for processing crustaceans comprising a feeder for feeding crustaceans to a singulating and conveying device, said singulating and conveying device delivering the crustaceans individually to at least one separating device, said at least one separating device separating the tail section of each crustacean from the head section thereof.

In one embodiment the feeder comprises a hopper or tank for receiving crustaceans and a conveyor for conveying said crustaceans from the hopper into the singulating and conveying device. In one embodiment, said conveyor may extend along one side of the hopper. Said conveyor may comprise a screw conveyor, preferably in the form of a helical spring, mounted in the base of the conveyor to extend along said side thereof and connected to a drive means for rotation of the conveyor to urge said crustaceans up said side to fall into said singulating and conveying device. A transverse wall may be provided within the hopper for dividing the hopper into a collection region and a conveying region, said transverse wall being spaced from the bottom of the hopper such that the conveyor extends from the bottom of the hopper along said side of the hopper, through said conveying region.

Preferably the singulating and conveying device comprises at least one elongate U or V shaped channel or trough mounted for oscillating or reciprocating motion to convey the crustaceans along the trough to at least one outlet end thereof. In one embodiment, said at least one channel or trough is substantially horizontally mounted. Alternatively at least a portion of said at least one channel or trough may be inclined to deliver crustaceans towards said at least one separating device.

In one embodiment at least a portion of the inner surface of the at least one trough may be adapted to interact with forwardly oriented formations on the crustaceans such that they are conveyed along the trough in a tail first orientation towards at least one the end of the trough. Preferably a plurality of projections are provided on the sides of the or each trough, said projections engaging formations on the crustaceans to prevent the crustaceans from being conveyed in a head first direction while allowing the crustaceans to be conveyed in a tail first direction. In one embodiment said projections comprise a plurality of transverse bars or wall members. Alternatively, at least a portion of the sides of the trough may be defined by a mesh material or otherwise perforated surface for engaging formations of the crustaceans.

Preferably at least one narrowed or reduced size opening is defined at or adjacent at least one end of the or each trough, said opening being adapted so that only a single crustacean can pass through said opening at a time. Downwardly extending gates and/or curtains may be provided above the trough to delimit the size of said opening such that only a single crustacean can pass through at a time.

In one embodiment said feeder may be arranged to deliver crustaceans into a substantially central region of a trough of the singulating and conveying device. A chute or duct may be provided for guiding crustaceans from the feeder into said trough.

A separating device may be arranged adjacent the or each outlet of the and singulating and conveying device.

In one embodiment, the singulating and conveying device may comprise a first horizontally mounted trough, and a pair of parallel second horizontally mounted troughs arranged perpendicular to and below said first trough to receive crustaceans falling from respective ends of the first trough. Preferably a separating device is mounted adjacent each end of each of said second troughs.

According to a further aspect of the present invention there is provided an orienting and singulating device comprising at least one, preferably substantially horizontally mounted, elongate U or V shaped channel or trough mounted for oscillating or reciprocating motion to convey the crustaceans along the trough to at least one outlet end thereof. Preferably at least a portion of the inner surface of the at least one trough is adapted to interact with forwardly oriented formations on the crustaceans such that they are conveyed along the trough in a tail first orientation towards the ends of the trough.

Preferably a plurality of projections are provided on the sides of the or each trough, said projections engaging formations on the crustaceans to prevent the crustaceans from being conveyed in a head first direction while allowing the crustaceans to be conveyed in a tail first direction. In one embodiment said projections comprise a plurality of transverse bars or wall members. Alternatively, at least a portion of the sides of the trough may be defined by a mesh material or otherwise perforated surface for engaging formations of the crustaceans.

Preferably at least one narrowed opening is defined at or adjacent each end of the or each trough, said opening being adapted so that only a single crustacean can pass through said opening at a time. Preferably downwardly extending gates and/or curtains are provided above the trough to further delimit the size of said openings such that only a single crustacean can pass through at a time.

In one embodiment, the orienting and singulating device comprises a first horizontally mounted trough, and a pair of parallel second horizontally mounted troughs arranged perpendicular to and below said first trough to receive crustaceans falling from respective ends of the first trough.

Embodiments of the present invention will now be described with reference to the accompanying drawings, in which:

FIG. 3 is a perspective view of the apparatus of FIG. 2;

FIGS. 4a to 4c are cross sectional views showing alternative embodiments of the trough(s) of the orienting and singulating device of the apparatus of FIG. 1 or 2;

FIG. 5 is a longitudinal sectional view through one of the troughs of the apparatus of FIG. 1 or 2.

Figure 1:
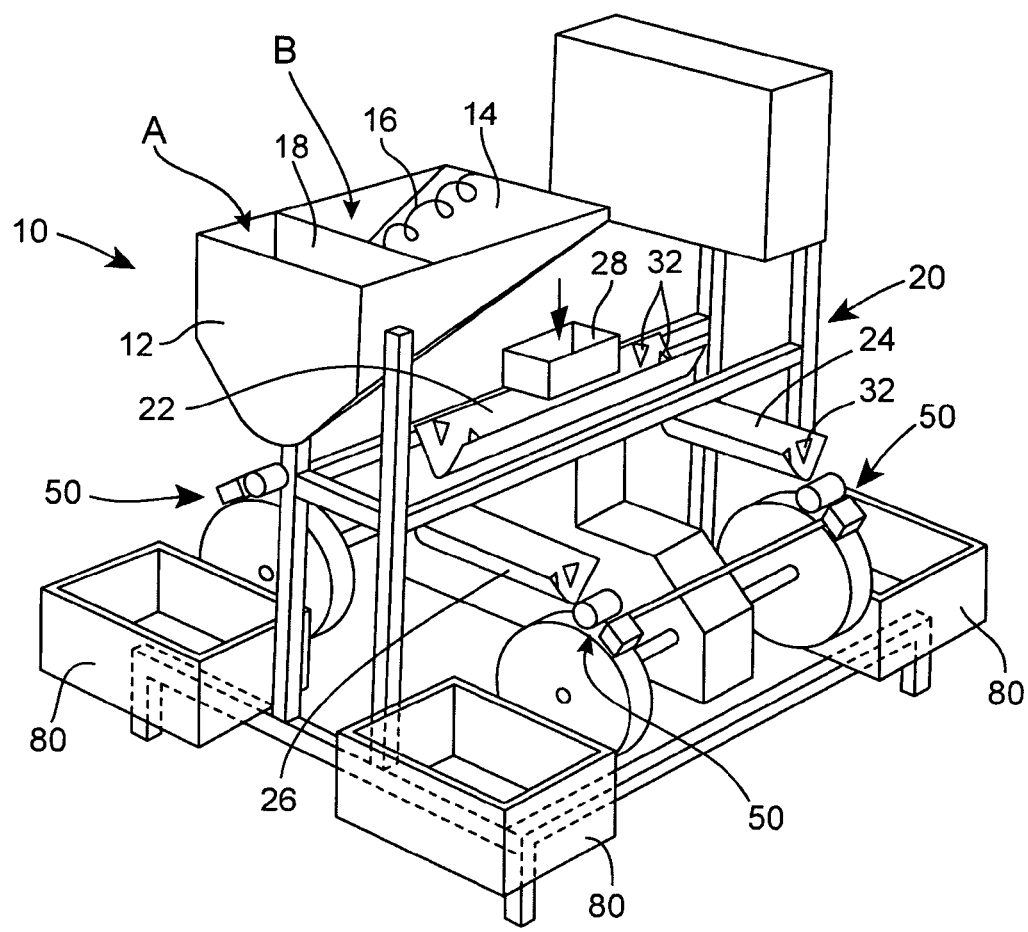
FIG. 1 is a perspective view of an apparatus for processing crustaceans according to a first embodiment of the present invention.

FIG. 1 illustrates an apparatus for processing crustaceans according to a first embodiment of the present invention, in particular for de-heading *Nephrops, Palaemon, Pandalus, Penaeus, Homarus Crangon* or related genus, hereinafter generally referred to as "crustaceans". The apparatus comprises a feeder 10, comprising a hopper 12 for receiving crustaceans, the hopper having an inclined side wall 14 upon which a helically coiled spring-like motor driven screw conveyor 16 is rotatably mounted for feeding crustaceans up said inclined side wall 14 and over the edge thereof to fall into an orienting and singulating device 20 therebelow. A transverse wall 18 is provided within the hopper 12, dividing the hopper into a collection region (A) and a conveying region (B), said transverse wall 18 being spaced from the bottom of the hopper 12 such that the conveyor 16 extends from the bottom of the hopper 12 along said side wall 14 of the hopper 12, through said conveying region B.

The orienting and singulating device 20 comprises a first horizontally mounted trough 22, and a pair of parallel second horizontally mounted troughs 24,26 arranged perpendicular to, and below, said first trough to receive crustaceans falling from respective ends of the first trough 22.

A duct 28 is provided for guiding the crustaceans from the feeder 10 into a central region of the first trough 22.

Figure 2:
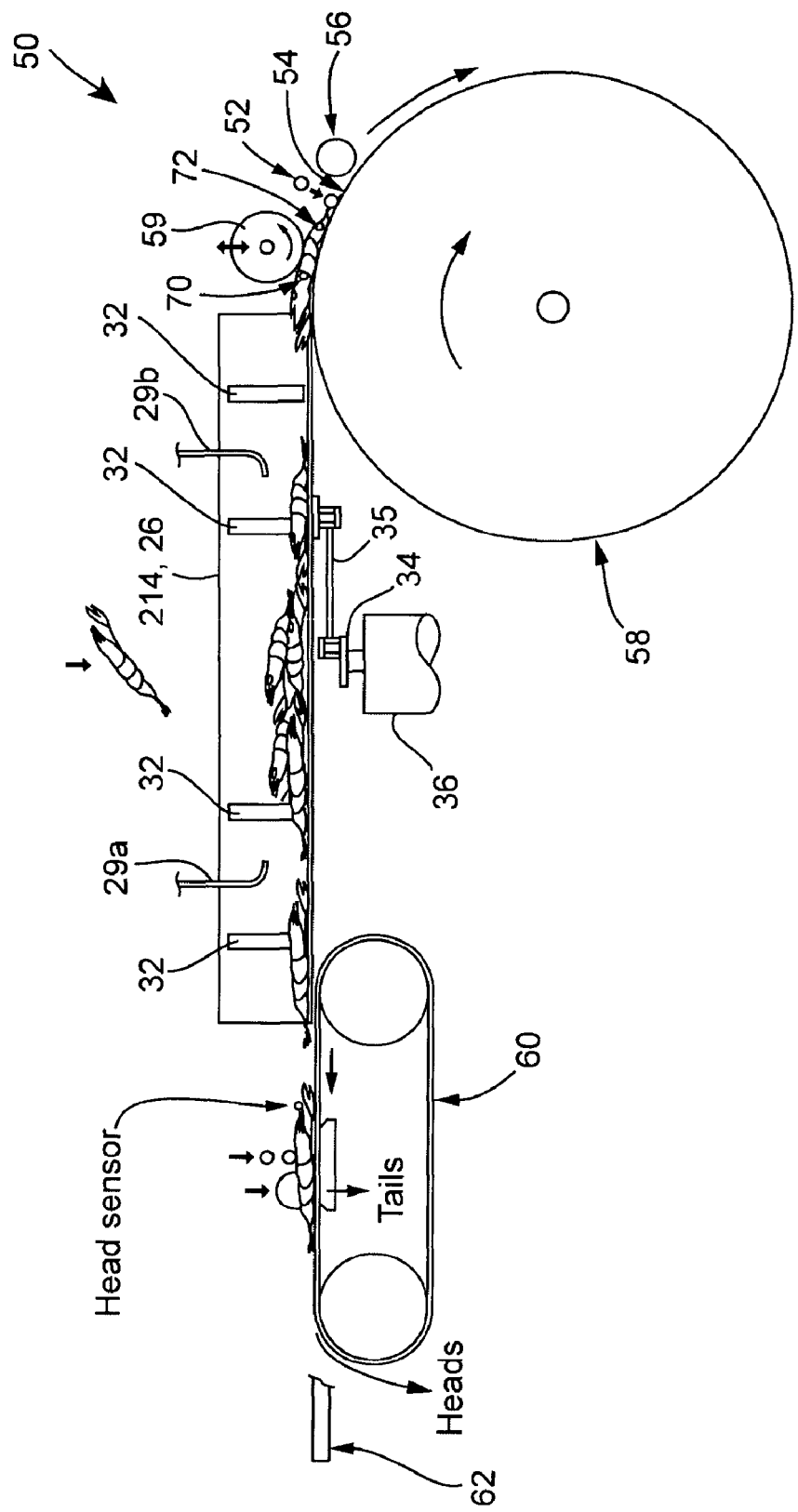
FIG. 2 is a schematic view of an apparatus for processing crustaceans according to a second embodiment of the present invention.

As shown in FIG. 2, a sensing means in the form of a light emitter 29a and light sensor 29b are mounted above the first trough 22, said sensing means being used to control the operation of the conveyor 16 to control the rate at which crustaceans are supplied to the orienting and singulating device 20.

A separating device 50 for separating the head section from the tail section of each crustacean is mounted adjacent each end of each of said second troughs, as will be described below in more detail.

Each trough 22,24,26 comprises a horizontally mounted, elongate U or V shaped channel, mounted for axial oscillating or reciprocating motion to shake and convey the crustaceans along the trough to at least one outlet end thereof. A portion of the inner surface of each trough 22,24,26 is adapted to interact with forwardly oriented formations on the crustaceans such that they are conveyed along the trough in a tail first orientation towards respective ends of the trough. In the embodiment shown, as illustrated in FIGS. 4a to 4c and FIG. 5, this is achieved by providing a plurality of spaced apart transverse ribs or bars 30 in the base of each trough 22,24,26, said ribs or bars 30 engaging forwardly facing formations on the crustaceans to prevent the crustaceans from being conveyed in a head first direction while allowing the crustaceans to be conveyed in a tail first direction. In an alternative embodiment (not shown) the sides of the trough may be defined by a mesh material or otherwise perforated surface for engaging formations of the crustaceans.

As shown in FIGS. 4a to 4c, each trough 22,24,26 may have a substantially U or V shaped cross section, the shape of the trough being adapted to suit the size of the crustaceans being conveyed.

As illustrated in FIG. 2, each trough may be driven for reciprocal axial movement by means of a crank 34 and connecting rod 35 mounted on an output shaft of a motor 36, preferably an electric motor.

Pairs of gate members 32 are mounted on the inner sides of the trough adjacent each end thereof to define narrowed openings, at or adjacent each end of the or each trough, each opening being configured so that only a single crustacean can pass through said opening at a time. Preferably downwardly extending curtains and/or barriers (not shown) are provided above one or more of the troughs 22,24,26 in the region of the gate members 32 to further delimit the size of said openings such that only a single crustacean can pass through at a time.

As can be seen from FIG. 2, each separating device 50 comprises a reciprocating squeezer 52 in the form of a bar or rod, moveable perpendicular to the normal direction of movement of the crustaceans to act against a conveying surface 54 to thereby pinch, squeeze and/or cut a crustacean between the reciprocating squeezer 52 and the conveying surface 54 at a predetermined location between the head region and the tail region of the crustacean to separate the head region from the tail region thereof.

The squeezer 52 may be resiliently or otherwise moveably mounted to allow the squeezer to follow the conveying surface 54 for a short distance as the squeezer strikes the surface to prevent the squeezer 52 from excessively arresting the motion of the crustaceans.

A reciprocating tail pusher 56 is provided adjacent and downstream of the squeezer 52, moveable perpendicular to the squeezer and substantially transverse to the normal direction of movement of the crustaceans to push the tail section to one side, assisting separation of the tail section from the head section and urging the tail section towards a tail section collection region 80. The tail pusher 56 may be mounted on the reciprocating squeezer.

One or both of the squeezer 52 and tail pusher 56 may be powered by a pneumatic or hydraulic ram or by an electrical device, such as solenoid, electromagnet or motor.

Alternatively, or additionally, one or more air or water jets may be provided for assisting the separation of the head and tail sections and/or for urging one or both of the separated sections to a respective collection receptacle 80.

In one embodiment, the conveying surface comprises the circumferential edge of a roller 58 mounted adjacent each outlet end of each second trough 24,26 of the orienting and singulating device 20. A pinch roller 59 is mounted parallel to said conveying surface 54 to act against said conveying surface 54 at the respective outlet of the orienting and singulating device 20 for flattening and guiding crustaceans against said conveying surface 54. Preferably said pinch roller 59 is arranged to control the speed of movement of the crustaceans along the conveying surface. The surface of the pinch roller 59 may be providing with a resilient grippy material while the surface of the roller 58 may be smooth such that the pinch roller 59 can control the speed of movement of the crustaceans supplied to the squeezer 52. The pinch roller 59 may be spring biased towards the conveying surface 54 to press the crustaceans thereagainst, In alternative embodiment, the conveying surface 54 may comprise a conveyor belt 60 or may be defined by the upper surface of a rotating disc 62.

Activation of each separating device 50 may be controlled by a control means including means for determining when a prawn is at the correct position for activation of the squeezer 52 such that the squeezer 52 strikes the prawn at said predetermined location. In one embodiment, said determining means comprises a light emitter, which may be a source of light of a specific frequency or range of frequencies in the visible or non-visible spectrum, mounted on one side of conveying surface and at least one light sensor 70 mounted on an opposite side of the conveying surface for detecting the presence of a prawn therebetween. The determining means may determine the correct position of a prawn for triggering the activation of the squeezer 52 by detecting a difference in translucency between the head and tail sections of the crustacean by means of said light sensor 70. In order to avoid false reading due to unusually opaque regions of the tail section, a further light sensor 72 may be located downstream of the head sensor for detecting the position of the tail section of the prawn. Alternatively, or additionally, the control means may be adapted to determine the presence of the head region only when the light sensor is obscured for a predetermined time interval to avoid false readings.

The at least one light sensor 70 is located upstream of the squeezer 52 to allow for the delay in the time taken for the squeezer 52 to move into contact with the prawn and the speed of movement of the prawn along the conveying surface. The system can be calibrated by controlling the speed of rotation of the pinch roller 59 and/or by adjusting the position of the light sensor 70 and/or by adjusting the timing and speed of operation of the squeezer 52.

A cover member (not shown) may be associated with the squeezer 52 such that the light sensor or sensors 70,72 and/or the light emitter is or are covered during separation of the head section from the tail section of a prawn to protect the light sensor(s) and/or light emitter from contamination.

Figure 6:
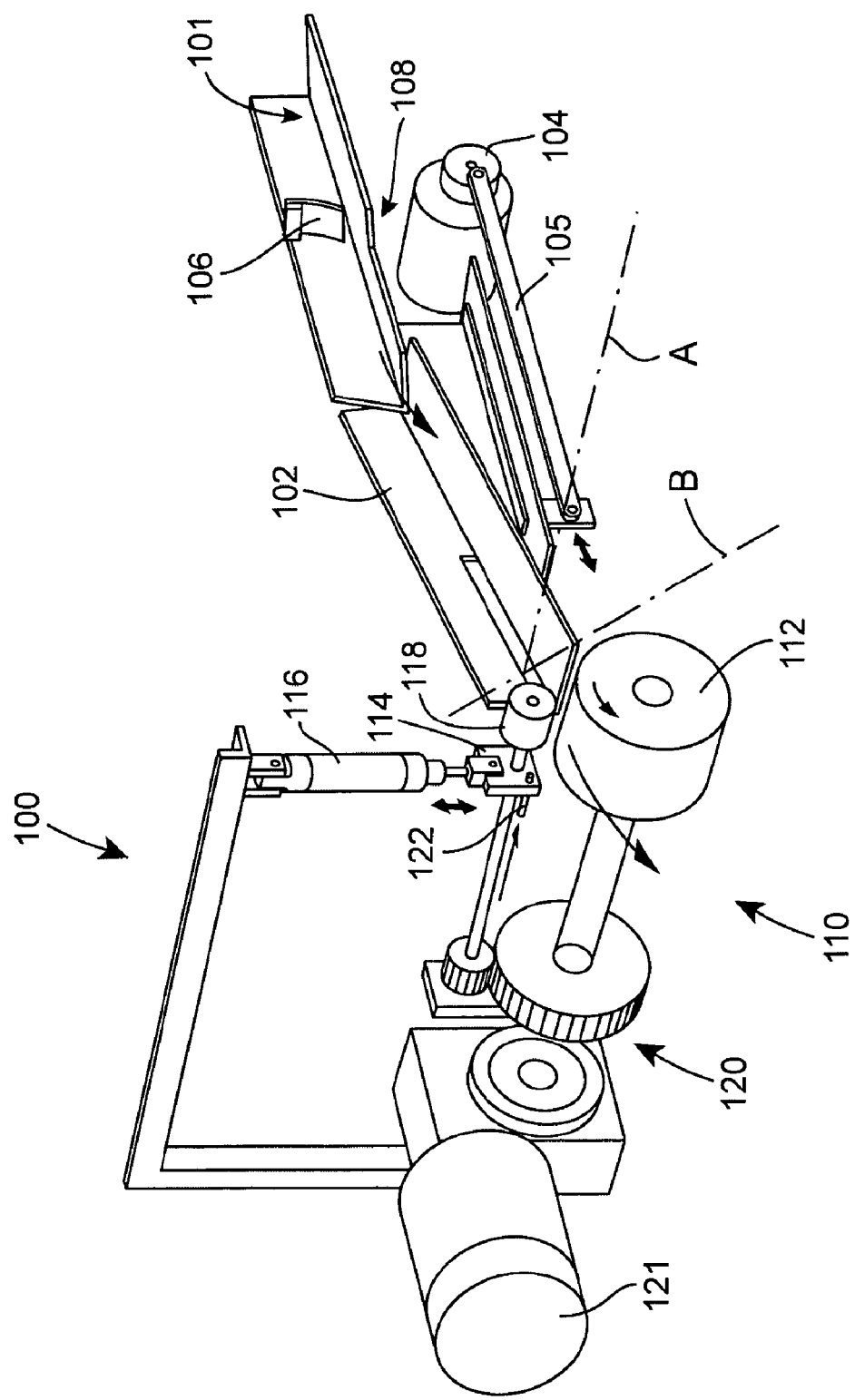
FIG. 6 is a perspective view of an apparatus for processing crustaceans according to a further embodiment of the present invention.

FIG. 6 shows a modified apparatus 100 specifically adapted for de-heading shrimp and *prawn pandalus borealis*, penaeus or related genus.

The main morphological difference between *Pandalus* and *Nephrops* is a lack of robust surface nodules which means that the unidirectional tail-first movement achieved for *Nephrops* on the orienting function of the orienting and singulating device of the first embodiment does not occur for the smoother bodied *Pandalus*. In addition the de-heading capacity requirements are much higher for *Pandalus* as 3-4,000 t need to be de-headed daily. Moreover, there is not necessarily a need for the prawn to be delivered tail first to the de-heading apparatus. Therefore a simpler conveying system is required in the form of a vibrating/reciprocating inclined smooth chute 102 or belt conveyor driven by motor 104 via a crank arm 105, whereby chute 102 delivers shrimp in a single line to a de-heading unit 110.

A feeder device 101 may be provided for feeding shrimp onto an upstream end of the chute 102. As shown in FIG. 6, the chute 102 is provided with a depending gate 106 and a reduced width 108 portion downstream of the gate 106 wherein surplus shrimp may be returned to the feeder device.

The de-heading unit 110 comprises a lower conveying roller 112 driven by a motor 121 and a reciprocating squeezer 114 moveable perpendicular to the normal direction of movement of the shrimp, by means of a pneumatic cylinder 116, to act against the conveying roller 112 to thereby pinch, squeeze and separate the shrimp at a predetermined position between the head region and tail region of the shrimp to separate the head region from the tail region.

A further modification is the provision of a rotating pinch roller 118 provided on a bearing plate of the reciprocating squeezer 114 of the de-heading unit 110 to rotate parallel to the conveying roller 112 in an opposite direction, facilitating a better contact with the de-heading area on the shrimp during a de-heading operation. As can be seen from FIG. 6, a system of gearing 120 between the conveying roller 112 and the pinch roller 118 ensures that the rollers 112,118 rotate at the same speed in opposite direction to one another to pull shrimp through the pinch between the rollers 112,118.

Preferably a guide roller or wheel (not shown) is provided immediately upstream of the de-heading unit for guiding the shrimp or prawn into the pinch of the de-heading unit 110. Such guide roller or wheel may comprise a flexible rubber or elastomeric wheel having a recessed circumferential slot or cut-out for guiding individual shrimp into the de-heading unit 110 at a predetermined rate. The wheel may be provided with metal studs or similar gripping means for providing enhanced grip onto the bodies of the shrimp.

The unidirectional chute 102 and rotating pinch block of the de-heading unit 110 allow for a compact design which means that more (for example up to 10 or more) de-heading units (chutes and pinch block) can be placed abreast in close proximity to ensure appropriate capacity with minimum space requirements.

An air or water nozzle 122 may be provided adjacent the pinch roller 118 for directing a jet of air or water transverse to the direction of movement of the shrimp to assist in separation of the head and tail portions and to assist in directing one or both or the portions to a respective collection region.

Given that both tails and heads exit the de-heading unit 110 after de-heading, a simple flume/flow separator system may be provided downstream of the de-heading unit 110 that separates heads and tails into separate streams in aerated water.

The control of the de-heading unit 110, in particular the timing of the movement of the pinch roller 118 against the conveying roller 112, may be controlled by one or more, preferably two or more, light sensors, as with the first embodiment, for detecting the position of the head portion and tail portion based upon the differential opacity and light transmission properties of the two sections.

A pair of spaced apart light emitters and sensors may be provided in series such that a difference in light detection between the two or more sensors may be indicative of the position of the shrimp or prawn (i.e. where the join between the head and tail sections lies between the two sensors and indicating whether the shrimp or prawn is in a head first or tail first orientation). To avoid interference between the two light emitters and sensors, the light emitters may be arranged to emit light in different directions with respect to each other. For example a first light emitter and associated sensor may be aligned on a line A as shown in FIG. 6 while a second light emitter and associated sensor may be aligned on line B as shown in FIG. 6.

The above principles will be readily applicable to other smaller commercially exploited crustaceans, given that many species share similar morphological features to *Pandalus*.

The present invention provides a reliable, fast and accurate mechanism for feeding, singulating and orienting crustaceans and for de-heading crustaceans that can provide greater productivity and product yield and an equal or better quality product than even careful hand de-heading.

The invention is not limited to the embodiment(s) described herein but can be amended or modified without departing from the scope of the present invention.

The invention claimed is:

1. A separating device for separating a head region from a tail region of a crustacean, said separating device comprises a reciprocating member moveable against a conveying surface upon which the crustacean is conveyed to pinch, squeeze and/or cut a crustacean between the reciprocating member and the conveying surface at a predetermined location between the head region and the tail region of the crustacean to separate the head region from the tail region thereof, wherein at least one pinch roller or pinch member is mounted parallel to said conveying surface to act against said conveying surface for flattening and guiding crustaceans against said conveying surface, said at least one pinch roller or pinch member being arranged to control the speed of movement of the crustaceans along the conveying surface.

2. A device as claimed in claim 1, wherein said conveying surface comprises a conveying roller or wheel.

3. A device as claimed in claim 2, wherein said conveying roller or wheel is driven by means of a drive motor.

4. A device as claimed in claim 1, wherein the conveying surface comprises a conveyor belt.

5. A device as claimed in claim 1, wherein said pinch roller or pinch member is mounted upon said reciprocating member to define a pinch between said pinch roller and said conveying surface for separating the head region from the tail region of a crustacean.

6. A device as claimed in claim 5, wherein said pinch roller is rotatably driven.

7. A device as claimed in claim 6, wherein said conveying suface comprises a conveying roller or wheel driven by means of a drive motor, wherein said pinch roller is driven to rotate in an opposite direction to said conveying roller to draw a crustacean through said pinch defined between said pinch roller and said conveying roller as said pinch roller is moved towards the conveying roller to separate the head portion from the tail portion of said crustacean.

8. A device as claimed in claim 1, wherein activation of the separating device is controlled by a control means including means for determining when a crustacean is at the correct position for the reciprocating member to strike the crustacean at said predetermined location.

9. A device as claimed in claim 8, wherein said determining means comprises at least one light emitter mounted on one side of conveying surface and at least one light receiver mounted on an opposite side of the conveying surface for detecting the presence of a crustacean therebetween.

10. A device as claimed in claim 9, wherein said determining means detects the correct position of a crustacean for triggering the separating means by detecting a difference in translucency between the head and tail sections of the crustacean.

11. A device as claimed in claim 1, wherein a reciprocating pusher is provided adjacent and downstream of said reciprocating member, moveable perpendicular to the reciprocating member and substantially transverse to the normal direction of movement of the crustaceans to assist separation of the tail section from the head section and urge one or both of the separated sections towards a respective collection region.

12. A device as claimed in claim 11, wherein the pusher is mounted on the reciprocating member.

13. A device as claimed in claim 1, wherein one or more air or water jets are provided to assist separation of the head and tail sections and/or for urging the one or both of the separated sections to a respective collection region.

14. An orienting and singulating device comprising at least one, elongate U or V shaped channel or trough mounted for oscillating or reciprocating motion to convey the crustaceans along the trough to at least one outlet end thereof, wherein at least a portion of the inner surface of the at least one trough is adapted to interact with forwardly oriented formations on the crustaceans such that they are conveyed along the trough in a tail first orientation towards the ends of the trough, wherein at least a portion of the sides of the trough is defined by a mesh material or otherwise perforated surface for engaging formations of the crustaceans.

15. A device as claimed in claim 14, wherein a plurality of projections are provided on the sides of the or each trough, said projections engaging formations on the crustaceans to prevent the crustaceans from being conveyed in a head first direction while allowing the crustaceans to be conveyed in a tail first direction.

16. A device as claimed in claim 15, wherein said projections comprise a plurality of transverse bars or wall members.

17. A device as claimed in claim 14, wherein at least one narrowed opening is defined at or adjacent at least one end of the or each trough, said opening being adapted so that only a single crustacean can pass through said opening at a time.

18. A device as claimed in claim 17, wherein at least one downwardly extending gate and/or curtain is provided above the trough to further delimit the size of said opening such that only a single crustacean can pass through at a time.

19. A device as claimed in claim 14, wherein said elongate U or V shaped channel is mounted substantially horizontally.

* * * * *